United States Patent [19]

Hegendörfer et al.

[11] Patent Number: 5,170,502
[45] Date of Patent: Dec. 15, 1992

[54] PROTECTIVE EYEWEAR ASSEMBLY

[75] Inventors: Erich Hegendörfer, Caldolzburg, Fed. Rep. of Germany; Richard W. Canavan, East Woodstock, Conn.; John G. Mathews, Providence, R.I.

[73] Assignee: Uvex Winter Optical, Inc., Smithfield, R.I.

[21] Appl. No.: 749,192

[22] Filed: Aug. 23, 1991

[30] Foreign Application Priority Data

Aug. 23, 1990 [DE] Fed. Rep. of Germany ... 9012115[U]

[51] Int. Cl.$^5$ .............................................. A61F 9/00
[52] U.S. Cl. ........................................... 2/13; 2/443; 2/446
[58] Field of Search ............... 2/11, 12, 13, 15, 426, 2/431, 434, 439, 442, 443, 444, 445, 446, 448, 450, 453

[56] References Cited

U.S. PATENT DOCUMENTS

| | | | |
|---|---|---|---|
| 2,187,542 | 1/1940 | Hagen | 2/8 |
| 2,607,919 | 8/1952 | Stegeman | 2/446 |
| 2,628,530 | 2/1953 | Rabben | 88/41 |
| 2,770,807 | 11/1956 | Taylor et al. | 2/14 |
| 2,905,172 | 9/1959 | Rodenhouse | 128/141 |
| 2,951,418 | 9/1960 | Bitner et al. | 88/41 |
| 2,998,610 | 9/1961 | Spero | 2/13 |
| 3,004,535 | 10/1961 | Nielson | 128/141 |
| 3,051,957 | 9/1962 | Chan | 2/14 |
| 3,146,295 | 8/1964 | Roland | 88/51 |
| 3,182,658 | 5/1965 | Klinger | 128/141 |
| 3,238,005 | 3/1966 | Petitto | 2/453 |
| 3,345,121 | 10/1967 | Angelis | 2/446 |
| 3,563,640 | 8/1968 | Wise et al. | 351/158 |
| 3,787,113 | 1/1974 | Shedrow | 351/43 |
| 3,901,589 | 8/1975 | Bienenfeld | 2/453 |
| 4,114,198 | 9/1978 | Sands | 2/8 |
| 4,190,334 | 2/1980 | O'Neil | 2/13 |
| 4,256,387 | 3/1981 | Kato | 2/13 |
| 4,317,240 | 3/1982 | Angerman | 2/446 |
| 4,711,539 | 12/1987 | Krusas et al. | 351/63 |
| 4,843,643 | 7/1989 | Parissenti | 2/13 |
| 4,930,163 | 6/1990 | King | 2/444 |
| 4,951,316 | 8/1990 | Moody | 2/12 |
| 4,951,322 | 8/1990 | Lin | 2/446 |

Primary Examiner—Werner H. Schroeder
Assistant Examiner—Diana L. Biefeld
Attorney, Agent, or Firm—Salter, Michaelson & Benson

[57] ABSTRACT

A protective eyewear assembly includes a protective eyeglasses portion including a protective lense portion and a frame portion, a corrective lense assembly including a corrective lense frame, a pair of corrective lenses in the corrective lense frame, a nose pad assembly on the corrective lense frame, and a clip assembly for releaseably securing the corrective lense assembly on the protective eyeglasses portion. The clip assembly preferably includes a clip portion on the protective eyeglasses portion and a tongue portion on the corrective lense frame which is releaseably securable in the clip portion for securing the corrective lense assembly to the protective eyeglasses portion.

13 Claims, 3 Drawing Sheets

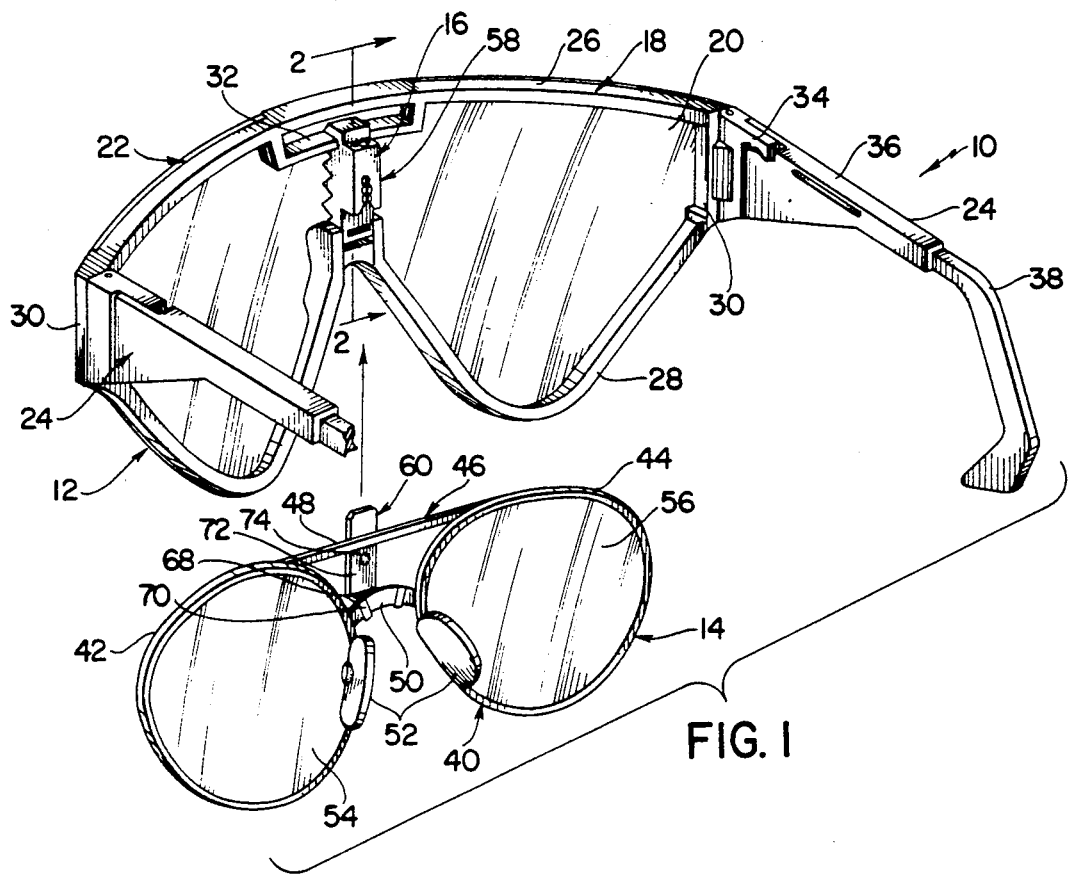
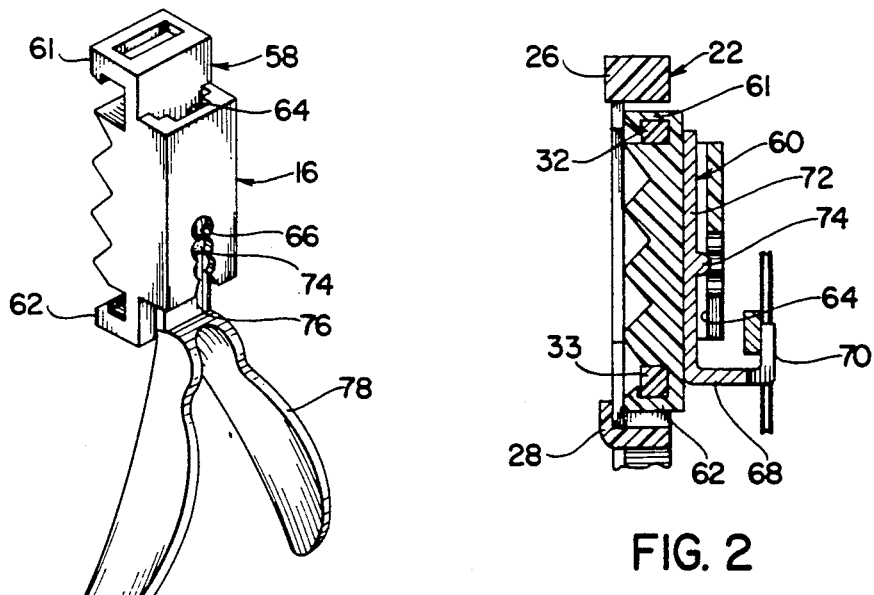

U.S. Patent    Dec. 15, 1992    Sheet 2 of 3    5,170,502
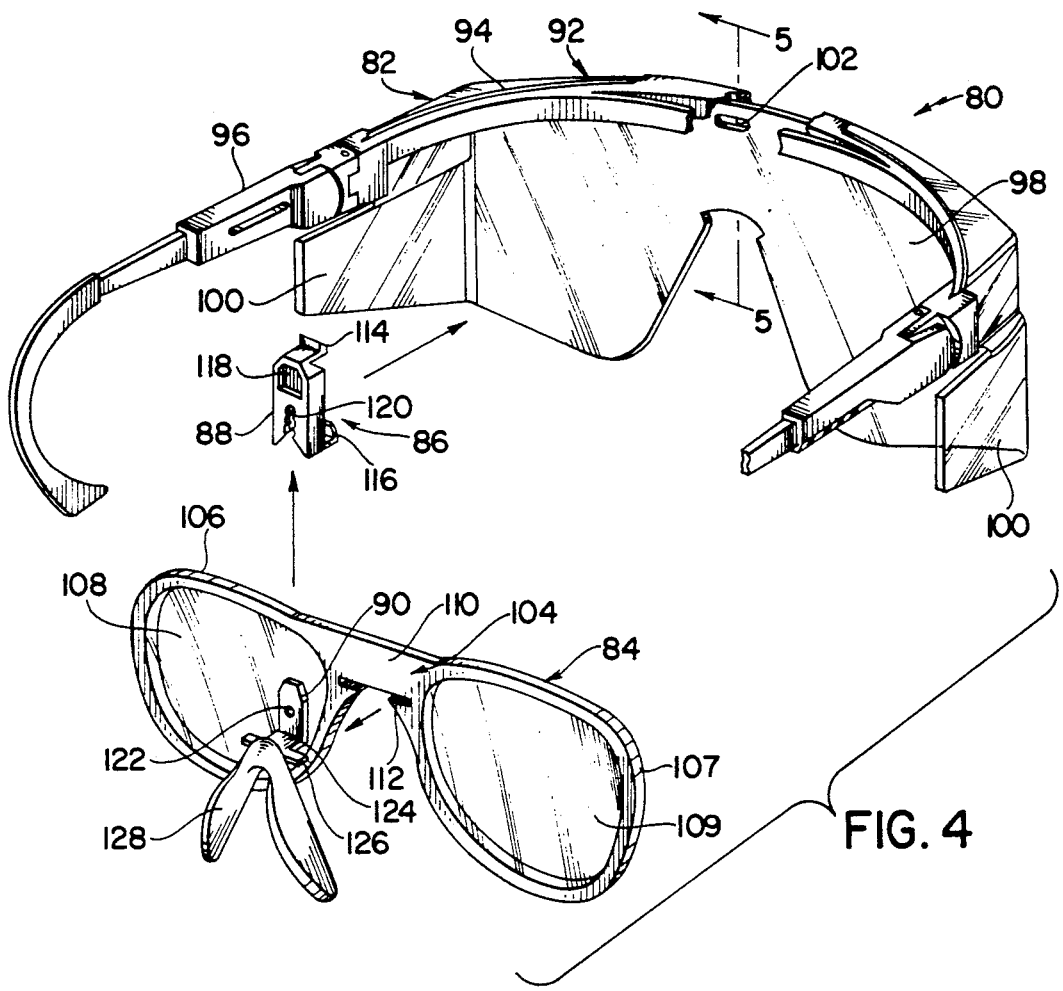
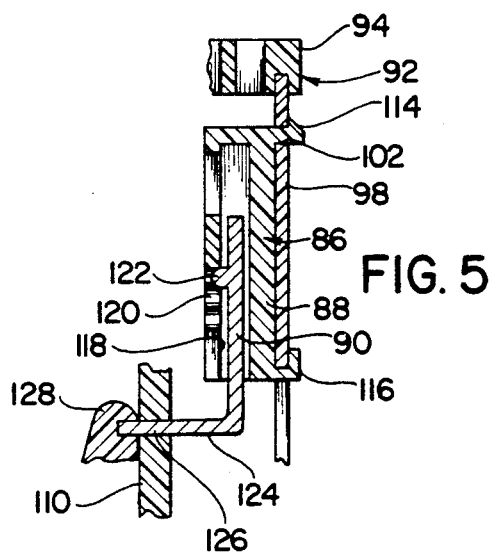
FIG. 4
FIG. 5

PROTECTIVE EYEWEAR ASSEMBLY

BACKGROUND AND SUMMARY OF THE INVENTION

The instant invention relates to eyewear, and more particularly to a protective eyewear assembly which is adapted to include optically corrective lenses.

While a variety of different types of protective eyewear have been heretofore available, they have generally not been adapted for use in combination with corrective lenses. Hence, persons who normally wear corrective eyeglasses have frequently been somewhat handicapped when it has become necessary for them to wear protective eyewear. In this regard, since most corrective eyeglasses do not provide sufficient protection to be classified as protective eyewear, conventional protective eyeglasses have generally been considered unsatisfactory for many hazardous applications. Accordingly, there is a recognized need for an effective assembly which incorporates corrective lenses into protective eyewear.

Previously available eyeglass assemblies and the like which represent the closest prior art to the subject invention of which the applicant is aware are disclosed in the Hagen U.S. Pat. No. 2,187,542; Rabben U.S. Pat. No. 2,628, 530; Taylor U.S. Pat. No. 2,770,807; Rodenhouse U.S. Pat. No. 2,905,172; Bitner et al U.S. Pat. No. 2,951,418; Nielson U.S. Pat. No. 3,004,535; Chan U.S. Pat. No. 3,051,957; Roland U.S. Pat. No. 3,146,295; Klinger U.S. Pat. No. 3,182, 658; Shedrow U.S. Pat. No. 3,787,113; Sands U.S. Pat. No. 4,114,198; Krusas et al U.S. Pat. No. 4,711,539; King U.S. Pat. No. 4,930,163; and Wise et al U.S. Pat. No. 3,563,640. However, these references fail to provide an effective protective eyewear assembly which is adapted to be utilized in combination with corrective lenses, and they also fail to suggest the specific features of the mounting assembly of the protective eyewear assembly of the instant invention. Hence, they are believed to be of only general interest with respect thereto.

The protective eyewear assembly of the instant invention comprises a protective lense portion including a lense frame member and a protective lense in the lense frame member, a pair of temple frame members which are pivotally mounted on the lense frame member, a nose pad assembly for supporting the lense frame member on the nose of a wearer, and a mounting assembly for detachably mounting the nose pad assembly on the lense frame member. The eyewear assembly preferably further includes a corrective lense assembly on the nose pad assembly, and the mounting assembly is preferably operative for mounting both the nose pad assembly and the corrective lense assembly on the lense frame member. The mounting assembly includes a clip portion having a downwardly opening vertically elongated slot therein on the lense frame member, and a tongue portion on the nose pad assembly which is releasably receivable in the slot in the clip portion for releasably securing the nose pad assembly on the lense frame member. The mounting assembly further includes means for adjustably securing the tongue portion in a plurality of different vertically adjusted positions relative to the clip portion. The adjustable securing means preferably includes a bump on the tongue portion and a vertical row of adjacent horizontally extending holes in the clip portion which are positioned so that the bump on the tongue portion is releaseably receivable in different holes in the clip portion for securing the relative positions of the tongue portion and the clip portion. The protective lense frame member, preferably includes vertically spaced upper and lower lense frame portions, and the protective lense is preferably received between the upper and lower lense frame portions. Further, the upper and lower lense frame portions are preferably vertically separable slightly for removing and replacing the protective lense. Still further, the clip portion is preferably pivotally attached to the protective lense frame portion adjacent the upper extremity thereof so that it is pivotable rearwardly relative to the lense frame portion for pivoting the nose pad assembly and the corrective lense assembly rearwardly relative thereto. The clip portion is preferably further receivable in engagement with the lower lense frame portion for releasably securing the upper and lower lense frame portions in a predetermined, vertically spaced relation in order to prevent inadvertent removal of the protective lense therefrom. When the clip portion is received in engagement with the lower lense frame portion in this manner, the clip portion is further operative for releasably retaining the clip portion, the nose pad assembly, and the corrective lense assembly in an operative position wherein the corrective lense assembly is substantially aligned with the protective lense. The corrective lense assembly preferably includes a corrective lense frame comprising left and right side portions and a center bridge portion extending between the left and right side portions. In one embodiment, the tongue portion is permanently secured to the center bridge portion so that it extends upwardly therefrom. In a second embodiment, the center bridge portion of the corrective lense frame has a horizontally extending downwardly opening slot formed therein and the tongue portion includes a horizontally extending base portion and a main portion which extends upwardly from the base portion. In this embodiment the base portion is received in the slot in the center bridge portion of the corrective lense frame and the main portion of the tongue portion is received in the clip portion for releasably securing the tongue portion to the clip portion. In a third embodiment, the center bridge portion has a recess formed therein and the tongue portion is received in the recess. Further, in this embodiment the slot in the clip portion has open opposite side ends and the center bridge portion and the tongue portion are received in the slot so that the center bridge portion extends outwardly through the opposite side ends of the clip portion.

It has been found that the protective eyewear assembly of the instant invention can be effectively utilized in combination with a corrective lense assembly, and that it can be readily and easily adjusted to accommodate various wearers. In this regard, the mounting assembly is operative for mounting the nose pad assembly and the corrective lense assembly so that the nose pad assembly and the corrective lense assembly can be readily and easily attached to and detached from the protective lense frame portion. More specifically, the mounting assembly is operative for attaching the corrective lense assembly to the lense frame portion so that the corrective lense assembly can be pivoted rearwardly and then moved downwardly to detach it from the lense frame portion. Further, the clip portion is operative for releasably securing the top and bottom portions of the lense frame portion so that they can be separated for replacing the protective lense.

Accordingly, it is a primary object of the instant invention to provide a protective eyewear assembly which is adapted to include corrective lenses.

Another object of the instant invention is to provide a protective eyewear assembly comprising a corrective lense assembly which can be readily assembled with and disassembled from the remaining components of the assembly.

An even still further object of the instant invention is to provide an effective eyewear assembly comprising a mounting assembly which includes a clip portion and a tongue portion for releasably securing a corrective lense assembly to a protective eyeglass assembly.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is an exploded perspective view of the first embodiment of the eyewear assembly of the instant invention;

FIG. 2 is an assembled sectional view thereof taken along line 2—2 in FIG. 1;

FIG. 3 is a perspective view of the mounting assembly thereof in combination with a nose pad assembly;

FIG. 4 is an exploded perspective view of a second embodiment of the protective eyewear assembly;

FIG. 5 is an assembled sectional view thereof taken along the line 5—5 in FIG. 4;

DESCRIPTION OF THE INVENTION

Figure 6:
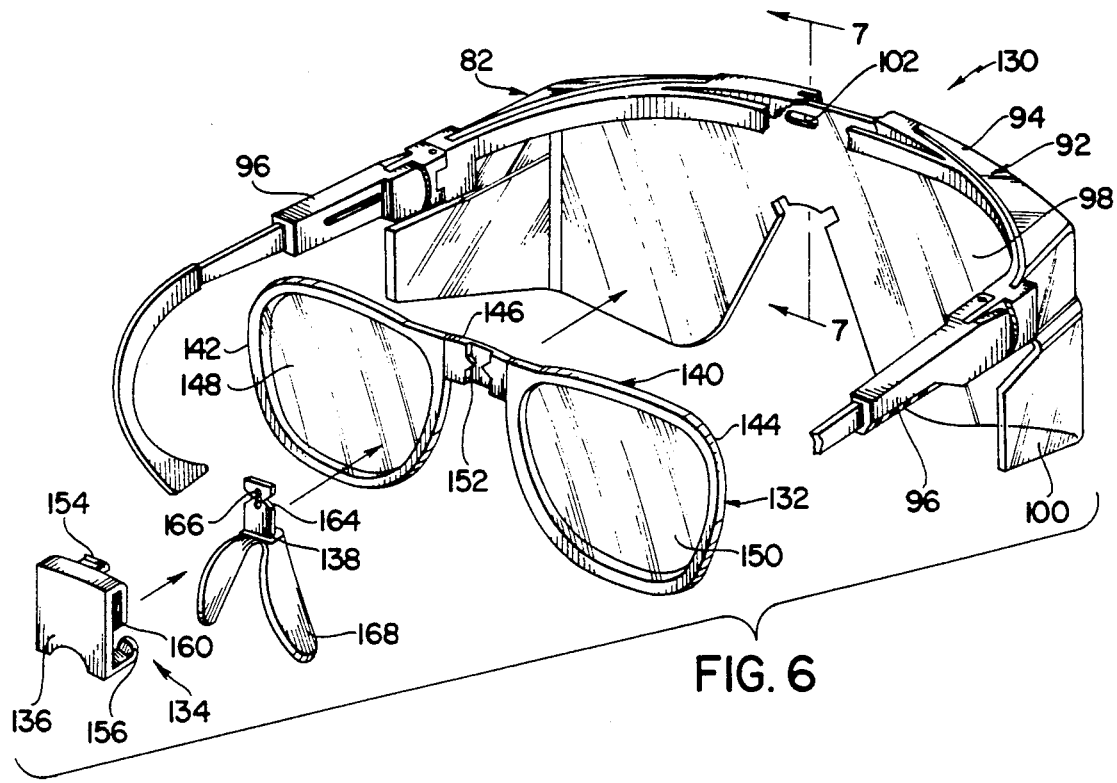
FIG. 6 is an exploded perspective view of a third embodiment of the protective eyewear assembly.

Referring now to the drawings, a first embodiment of the protective eyewear assembly of the instant invention is illustrated in FIG. 1 and generally indicated at 10. The eyewear assembly 10 includes a protective eyeglasses portion generally indicated at 12, a corrective lense assembly generally indicated at 14, and a corrective lense mounting assembly generally indicated at 16. The eyeglasses portion 12 comprises a frame portion 18 and a lense 20 in the frame portion 18, and the mounting assembly 16 is releasably securable to the frame portion 18 for releasably mounting the corrective lense assembly 14 thereon.

The frame portion 18 comprises a lense frame member generally indicated at 22, and a pair of temple frame members generally indicated at 24. The lense frame member 22 is preferably integrally molded from a suitable durable plastic material and it includes upper and lower lense frame portions 26 and 28, respectively, which are integrally joined at opposite end portions 30. The upper portion 26 extends along the upper extremity of the protective eyeglasses portion 12 and it includes an upper crossbar 32 which extends across the central portion of the lense frame member 22 in slightly downwardly spaced relation to the upper extremity thereof. The lower lense frame portion 28 is formed to define the lower extremity of the lense frame member 22, and it includes a centrally located lower crossbar 33 which is spaced upwardly slightly from the lower central extremity of the lense frame member 22. The temple portions 24 are pivotally attached to the end portions 30 in a conventional manner so that they are pivotable about substantially vertical pivot axes. The temple frame members 24 are also made from a suitable plastic material and they are preferably adapted to be angularly adjusted about substantially horizontal pivot axes and longitudinally adjusted to different lengths in order to adapt the protective eyeglasses portion 12 to fit different wearers. Specifically, the temple frame pieces include front portions 34, central portions 36 which are pivotable relative to the front portions 34, and rear portions 38 which are telescopically received in the central portions 36 for longitudinally adjusting the temple frame portions 24. However, it will be understood that other embodiments of the eyeglasses portion 12 which include other types of temple frame portions are contemplated.

The corrective lense assembly 14 comprises a frame portion generally indicated at 40 which includes left and right side portions 42 and 44, respectively, and a central portion 46 comprising an upper crossbar 48, and a lower bridge 50. The frame portion 40 has a pair of nose pads 52 mounted thereon, and left and right corrective lenses 54 and 56, respectively, are received in the left and right side portions 42 and 44, respectively.

The mounting assembly 16 comprises a clip portion generally indicated at 58 and a tongue portion generally indicated at 60. The clip portion 58 is most clearly illustrated in FIGS. 2 and 3 and it includes upper and lower jaws 61 and 62, respectively, which are engageable with the crossbars 32 and 34, respectively, for releasably securing the clip portion 58 to the frame portion 18. The clip portion 58 further includes a downwardly opening tubular passage or slot 64, and it has a vertically aligned row of connected adjacent horizontally extending holes 66 formed therein which communicate with the slot 64. The tongue portion 60 is preferably made from a suitable durable metal, such as brass, and it includes a base portion 68 which is permanently secured to the bridge portion 50 of the corrective lense assembly 14 with permanently secured fingers 70. The clip portion 60 further includes a main portion 72 having a bump 74 formed thereon. The tongue portion 60 is constructed so that the main portion 72 is receivable in the slot 64 by advancing it upwardly through the bottom end of the slot 64. Further, the bump 74 is positioned and constructed so that it is receivable in different holes 66 for releasably retaining the tongue portion 60 in different vertically adjusted positions in the slot 64.

For use and operation of the eyewear assembly 10, the clip portion 58 is secured to the crossbars 32 and 34 for releasably retaining the upper and lower lense frame portions 26 and 28 in a predetermined spaced relation so that the lense 20 is retained in the lense frame portion 18. The corrective lense assembly 14 can then be assembled with the lense frame portion 18 by inserting the tongue portion 60 into the lower end of the slot 64 and advancing the tongue portion 60 upwardly so that the bump 74 is received in one of the holes 66. The position of the corrective lense assembly 14 relative to the protective eyeglasses portion 12 can then be vertically adjusted by moving the bump 74 into different holes 66 in order to properly align the corrective lense assembly 14 with the protective lense 20. Further, in order to detach the lense assembly 14 from the protective eyeglasses portion 12 the corrective lense assembly 14 can be pivoted upwardly so that the jaw 62 is disengaged from the crossbar 34 to enable the clip portion 58 to pivot on the upper crossbar 32. The tongue portion 60 can then be easily disengaged from the clip portion 58 by moving the tongue portion 60 downwardly so that the bump 74 passes downwardly through the row of holes 66.

Referring to FIG. 3, the clip portion 58 is illustrated in combination with a tongue portion 76 and a nose pad assembly 78. The tongue portion 76 is virtually identical to the main portion 72 of the tongue portion 60, and it includes a bump 74. The nose pad assembly 78 is attached to the lower end of the tongue portion 76 and it is adapted to be received on the nose of a wearer for supporting the protective eyeglasses 12 thereon. The nose pad assembly 78 is adapted to be utilized in combination with the protective eyeglasses 12 without a corrective lens assembly 14 and hence, the nose pad assembly 78 and the tongue 76 provide a convenient means for adapting the protective eyeglasses 12 for use by wearers who do not require corrective lenses.

Figure 7:
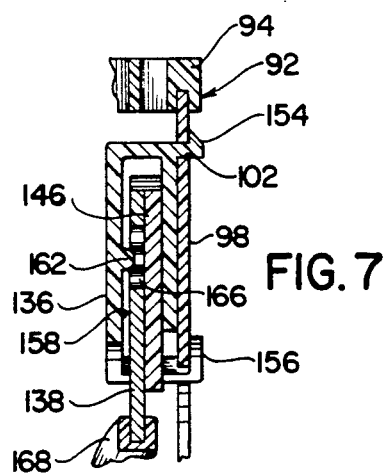
FIG. 7 is an assembled sectional view thereof taken along line 7—7 in FIG. 6.

Referring now to FIGS. 6 and 7, a second embodiment of the eyewear assembly of the instant invention is illustrated and generally indicated at 80. The eyewear assembly 80 comprises a protective eyeglasses portion generally indicated at 82, a corrective lens assembly generally indicated at 84, and a mounting assembly generally indicated at 86 comprising a clip portion 88 and a tongue portion 90. The mounting assembly 86 is adapted for securing the corrective lens assembly 84 to the eyeglasses assembly 82 in a manner similar to the mounting assembly 16 in the eyewear assembly 10.

The protective eyeglasses assembly 82 comprises an eyeglasses assembly of the general type disclosed in copending Application No. 07/741,557 and it includes a frame portion generally indicated at 92 including a lense frame portion 94 and a pair of temple frame portions 96. The temple frame portions 96 are adapted to be adjusted to various different vertical angles, as well as longitudinally adjusted to different lengths, although the use of various other types of temple frame portions in the eyewear assembly 80 is contemplated. The protective eyeglasses assembly 82 further comprises a central lense portion 98 which is attached to the lense frame portion 94 and a pair of side lense portions 100 which extend rearwardly from opposite side extremities of the central lense portion 98. The central lense portion 98 has an aperture 102 formed therein adjacent the central upper extremity thereof for securing the clip member 88 thereto.

The corrective lense assembly 84 comprises a lense frame portion 104 which includes left and right side portions 106 and 107, having left and right lenses 108 and 109 respectively therein, and a central portion 110 having a horizontally extending slot 112 formed therein which opens downwardly in the central portion thereof.

The clip portion 88 is preferably integrally molded from a suitable durable rigid plastic material and it includes upper and lower jaws 114 and 116, respectively, both of which have upwardly turned jaw ends. The clip portion 88 has a vertically elongated, downwardly opening slot 118 formed therein and a plurality of connected adjacent holes 120 are formed in the rearwardly facing wall of the clip portion 88 so that the holes 120 communicate with the slot 118. The clip portion 88 is adapted to be received in assembled relation with the central lense portion 98 of the protective eyeglasses assembly 82 so that the upper jaw 114 is received in the aperture 102, and so that the lower jaw 116 engages the lower extremity of the central portion of the central lense portion 98 for releasably securing the clip portion 88 thereto. The tongue portion 90 is preferably made from a suitable durable metal, such as brass, and it has a bump 122 formed thereon which is receivable in different holes 120 for adjustably retaining the tongue portion 90 in different vertically adjusted positions. The tongue portion 90 also comprises a base portion 124 which includes a pair of outwardly extending wings 126, and a nose pad assembly 128 is assembled on the base portion 124. The base portion 124 is assembled with the lense frame portion 104 so that the wings 126 are received in the slot 112, and so that the tongue portion 90 is receivable in the slot 118 in the clip portion 88 for releasably securing the corrective lense assembly 84 and the nose pad assembly 128 to the clip portion 88. The wings 126 are preferably secured in the slot 118 with suitable means, such as detents or a suitable adhesive, in order to secure the corrective lense assembly 84 to the clip portion 88. Accordingly, the mounting assembly 86 can be effectively utilized for mounting the corrective lense assembly 84 on the protective eyeglasses assembly 82 in the manner illustrated. Alternatively, a tongue portion 90 with a nose pad assembly 128 thereon but not a corrective lense assembly 84 can be assembled with the clip portion 88 to enable the nose pad assembly 128 to be utilized for supporting the protective eyeglasses assembly 82 on the nose of a wearer without a corrective lense assembly 84. In either case, because of the manner in which the clip portion 88 is secured to the central lense portion 98 the clip portion 88 can be tilted rearwardly by disengaging the jaw 116 from the central lense portion 98 to facilitate the assembly of the tongue portion 90 in the clip portion 88.

Referring now to FIGS. 6 and 7, a third embodiment of the eyewear assembly of the instant invention is illustrated and generally indicated at 130. The eyewear assembly 130 a includes protective eyeglasses portion 82 which is virtually identical to the protective eyeglasses portion 82 in the eyewear assembly 80, a corrective lense assembly 132, and a mounting assembly generally indicated at 134 which includes a clip portion 136 and a tongue portion 138. The corrective lense assembly 132 includes a frame portion generally indicated at 140 comprising left and right side frame portions 142 and 144, respectively, which are joined by a center frame portion 146. Corrective lenses 148 and 150 are provided in the left and right side frame portions 142 and 144, respectively, and an irregularly shaped recess 152 is provided in the center portion 146 as shown.

The clip portion 136 includes upper and lower jaws 154 and 156, respectively, which are receivable in engagement with the central lense portion 98 of the protective eyeglasses assembly 82 in a manner similar to the clip portion 88 in the eyewear assembly 80. Specifically, the upper jaw 154 is receivable in engagement in the aperture 102 in the central lense portion 98, and the lower jaws 156 are receivable in engagement with the lower edge of the central lense portion 98 for releasably retaining the clip portion 136 in engagement with the central lense portion 98. The clip portion 136 has a vertically elongated, downwardly opening slot 158 formed therein, and the slot 158 has opposite open side ends 160. A forwardly facing bump 162 is formed in the interior of the slot 158. The tongue portion 138 is preferably made from a suitable durable metal, such as brass, and it has a pair of side notches 164 formed therein which adapt the tongue portion 138 to the configuration of the recess 152. Accordingly, the tongue portion 138 is receivable in the recess 152 so that it is retained in a predetermined vertical orientation therein. Further, once the tongue portion 138 is received in the recess 152, the center frame portion 146 and the tongue portion 138 are receivable as a unit in the slot 158 so that they are retained in assembled relation by the clip portion 146. Further, the tongue portion 138 has a vertical row of adjacent connected horizontally extending holes 166 formed therein which are adapted for receiving the bump 162 in order to retain the tongue portion 138 in different vertically adjusted positions in the clip portion 136. A nose pad assembly 168 is permanently secured to the lower end of the tongue portion 138 for supporting the eyewear assembly 130 on the nose of a wearer.

Accordingly, for use and operation of the eyewear assembly 130, the tongue portion 138 is assembled with the central frame portion 146 of the corrective lense assembly 132, and the clip portion 136 is assembled on the tongue portion 138 and the central frame portion 146. The clip portion 136 is then assembled on the central lense portion 98 in order to secure the protective lense assembly 132 thereto. The lense assembly 132 and the nose pad assembly 168 can then be vertically adjusted by repositioning the bump 162 in the holes 166. Further, the protective eyeglasses assembly 82 can be adjusted by adjusting the temple frame portions 96 to various angles and lengths so that the eyewear assembly 130 can be effectively and comfortably worn by a wearer.

It is seen, therefore, that the instant invention provides an effective eyewear assembly. The eyewear assemblies 10, 80, and 130 include protective eyeglasses assemblies for protecting the eyes of a wearer. However, the eyewear assemblies 10, 80, and 130 are also adapted to include corrective lense assemblies in order to optically correct them to compensate for the eyes of wearers. Further, the corrective lense assemblies 14, 84, and 132 are adapted so that they can be effectively and easily assembled with and disassembled from the protective eyeglass assemblies 12 and 82. Hence, it is seen that the eyewear assembly of the instant invention represents a significant advancement in the art relating to protective eyewear which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a protective eyewear assembly comprising a protective lense portion including a lense frame member and protective lense means in said lense frame member, a pair of temple frame members on said lense frame member and nose pad means for supporting said lense frame member on a nose of a wearer, the improvement comprising a mounting assembly for detachably mounting said nose pad means on said protective lense portion, said mounting assembly including a clip portion having an elongated vertically extending tubular slot therein and a tongue portion, one of said clip portion or said tongue portion being mounted on said protective lense portion, the other of said clip portion or said tongue portion being mounted on said nose pad means, said tongue portion being releaseably securable in said slot for releaseably securing said nose pad means on said protective lense portion, and corrective lense means attached to said nose pad means, said mounting assembly mounting both said nose pad means and said corrective lense means on protective lense portion.

2. In a protective eyewear assembly comprising a protective lense portion including a lense frame member and protective lense means in said lense frame member, a pair of temple frame members on said lense frame member, and nose pad means for supporting said lense frame member on a nose of a wearer, the improvement comprising a mounting assembly for detachably mounting said nose pad means on said protective lense portion, said mounting assembly including a clip portion on said protective lense portion, said clip portion having a downwardly opening vertically elongated slot therein, a tongue portion on said nose pad means, said tongue portion being releasably receivable in said slot for releasably securing said nose pad means on said lense frame member, and means for adjustably securing said tongue portion in a plurality of different vertically adjusted positions relative to said clip portion.

3. In the protective eyewear assembly of claim 2, said adjustable securing means comprising detent means for adjustably securing said tongue portion relative to said clip portion.

4. In a protective eyewear assembly comprising a protective lense portion including a lense frame member and protective lense means in said lense frame member, a pair of temple frame members on said lense frame member, and a nose pad means for supporting said lense frame member on a nose of a wearer, the improvement comprising a mounting assembly for detachably mounting said nose pad means on said protective lense portion, said mounting assembly including a clip portion on said protective lense portion, said clip portion having a downwardly opening vertically elongated slot therein, a tongue portion on said nose pad means, said tongue portion being releasably receivable in said slot for releasably securing said nose pad means on said lense frame member, and corrective lense means attached to said nose pad means, said mounting assembly mounting both said nose pad means and said corrective lense means on said lense frame member.

5. In the protective eyewear assembly of claim 4, said mounting means further comprising means for adjustably securing said tongue portion in a plurality of different vertically adjusted positions relative to said clip portion for adjustably retaining said nose pad means and said corrective lense means in a plurality of different vertically adjusted positions relative to said lense frame member.

6. In the protective eyewear assembly of claim 4, said lense frame member having an upper extremity, said clip portion being pivotally attached to said lense frame member adjacent the upper extremity thereof so that said clip portion is pivotable rearwardly relative to said lense frame portion for pivoting said nose pad assembly and said corrective lense means rearwardly.

7. The protective eyewear assembly of claim 6 further comprising means for releasably retaining said clip portion in a predetermined forwardly pivoted position wherein said corrective lense means is substantially aligned with said protective lense means.

8. In the protective eyewear assembly of claim 4, said tongue portion having a bump thereon, said clip portion having a vertically extending row of horizontally extending holes therein, said bump being receivable in different ones of said holes for releasably securing the vertical position of said nose pad means and said corrective lense means relative to said lense frame portion.

9. In the protective eyewear assembly of claim 4, said corrective lense means including a corrective lense frame including left and right side portions and a center portion extending between said left and right side portions, said center portion having a recess formed therein, said tongue portion being received in said recess, said slot having opposite open side ends, said center portion and said tongue portion being received in said slot so that said center portion extends outwardly through said opposite open side ends.

10. In the protective eyewear assembly of claim 4, said corrective lense means including a corrective lense frame including left and right side portions and a center portion extending between said left and right side portions, said center portion having a horizontally extending downwardly open slot formed thereon, said tongue portion including a horizontally extending base portion and a main portion extending upwardly from said base portion, said base portion being received in the slot in said center portion, said main portion being received in the slot in said clip portion.

11. In a protective eyewear assembly comprising a protective lense portion including a lense frame member and protective lense means in said lense frame member, a pair of temple frame members on said lense frame member, and nose pad means for supporting said lense frame member on a nose of a wearer, the improvement comprising a mounting assembly for detachably mounting said nose pad means on said protective lense portion, said mounting assembly including a clip portion on said protective lense portion, said clip portion having a downwardly opening vertically elongated slot therein, and a tongue portion on said nose pad means, said tongue portion being releasably receivable in said slot for releasably securing said nose pad means on said lense frame member, said lense frame member including vertically spaced upper and lower lense frame portions, said protective lense means being received between said upper and lower lense frame portions, said upper and lower lense frame portions being vertically separable for replacing said protective lense means, said clip portion releasably retaining said upper and lower lense frame members in a predetermined vertically spaced relation in order to prevent inadvertent removal of said protective lense means from said lense frame member.

12. The protective eyewear assembly of claim 11, further comprising corrective lense means attached to said nose pad means, said mounting assembly mounting both said nose pad means and said corrective lense means on said lense frame member.

13. In the protective eyewear assembly of claim 12, said mounting means further comprising means for adjustably securing said tongue portion in a plurality of different vertically adjusted positions relative to said clip portion for adjustably retaining said nose pad means and said corrective lense means in a plurality of different vertically adjusted positions relative to said lense frame member.

* * * * *